(12) United States Patent
Bamford et al.

(10) Patent No.: US 6,237,001 B1
(45) Date of Patent: May 22, 2001

(54) MANAGING ACCESS TO DATA IN A DISTRIBUTED DATABASE ENVIRONMENT

(75) Inventors: Roger J. Bamford, Woodside; Boris Klots, Belmont, both of CA (US)

(73) Assignee: Oracle Corporation, Redwood Shores, CA (US)

( * ) Notice: Subject to any disclaimer, the term of this patent is extended or adjusted under 35 U.S.C. 154(b) by 0 days.

(21) Appl. No.: 09/095,463

(22) Filed: Jun. 10, 1998

Related U.S. Application Data

(63) Continuation-in-part of application No. 08/842,169, filed on Apr. 23, 1997, now Pat. No. 5,956,731.

(51) Int. Cl.$^7$ .................................................... G06F 15/00
(52) U.S. Cl. ........................... 707/100; 707/3; 707/8; 707/10; 707/202; 707/205
(58) Field of Search .................... 707/2, 3, 10, 100, 707/104, 102, 101, 201, 202, 1; 395/575, 600, 671, 614

(56) References Cited

U.S. PATENT DOCUMENTS

| | | | |
|---|---|---|---|
| 5,247,664 | * 9/1993 | Thomson et al. | 395/600 |
| 5,280,612 | * 1/1994 | Lorie et al. | 395/600 |
| 5,287,496 | * 2/1994 | Chen et al. | 395/600 |
| 5,327,556 | * 7/1994 | Mohan et al. | 395/600 |
| 5,333,303 | * 7/1994 | Mohan | 395/575 |
| 5,701,480 | * 12/1997 | Raz | 395/671 |
| 5,729,738 | * 3/1998 | Watanabe et al. | 395/614 |
| 5,781,910 | * 7/1998 | Gostanian et al. | 707/201 |
| 5,826,270 | * 10/1998 | Rutkowski et al. | 707/10 |
| 5,835,757 | * 11/1998 | Oulid-Aissa et al. | 395/610 |
| 5,884,327 | * 3/1999 | Cotner et al. | 707/202 |
| 5,920,857 | * 7/1999 | Rishe et al. | 707/3 |
| 5,946,698 | * 8/1999 | Lomet | 707/202 |

* cited by examiner

Primary Examiner—Thomas Black
Assistant Examiner—Thuy Do
(74) Attorney, Agent, or Firm—Hickman Palermo Truong & Becker LLP; Brian D. Hickman; Edward A. Becker

(57) ABSTRACT

A method and an apparatus for managing access to data on a distributed database system is provided. A snapshot list is generated for a transaction executing on the distributed database system. The snapshot list specifies snapshot times for a plurality of locations in the distributed database system. The snapshot times are determined based upon the location of a data item and the location where the transaction is executing. The selection of a version of the data item to be provided to the transaction is made based upon the snapshot time for the location associated with the data.

21 Claims, 10 Drawing Sheets

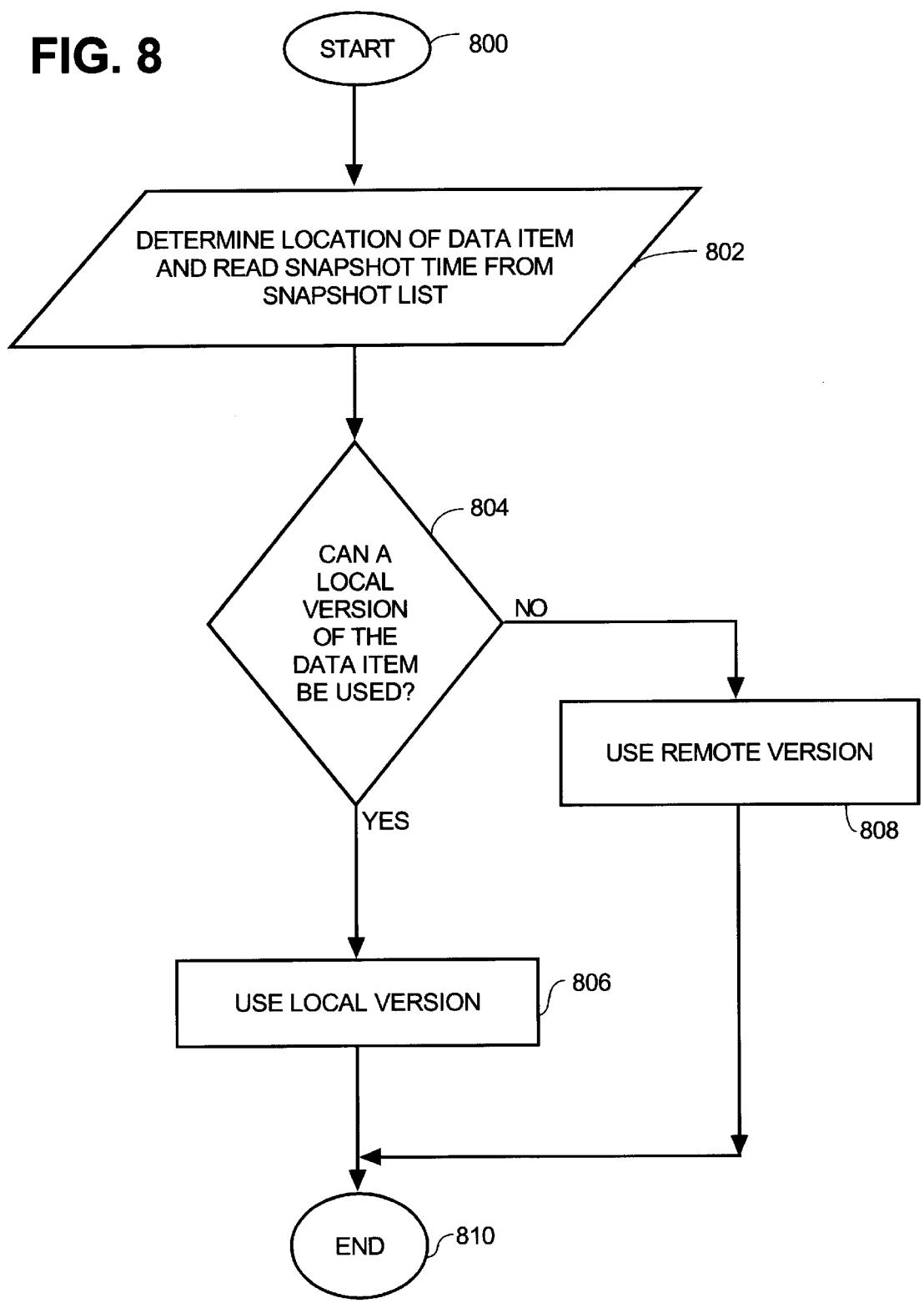

MANAGING ACCESS TO DATA IN A DISTRIBUTED DATABASE ENVIRONMENT

This application is a continuation-in-part of application Ser. No. 08/842,169 filed on Apr. 23, 1997 and now U.S. Pat. No. 5,956,731, the disclosures of which is incorporated by reference.

FIELD OF THE INVENTION

The present invention relates to accessing stored data in a distributed database environment, and more specifically, to a method and apparatus for determining which version of a data item to provide to a transaction that requests the data item.

BACKGROUND OF THE INVENTION

In typical database systems, users store, update and retrieve information by submitting commands or statements to a database application. To be correctly processed, the statements must comply with the database language that is supported by the database application. One popular database language is known as Structured Query Language (SQL).

A logical unit of work that is comprised of one or more database language statements is referred to as a transaction. When multiple users share a database system, it is impractical to allow only one transaction to execute at a time. However, when many transactions are allowed to execute at the same time, the issue of consistency arises. Transactional database management systems provide a special statement—"commit"—which a user or program submits to delineate the statements that make up a transaction.

To ensure predictable and reproducible results, techniques have been developed which protect concurrently executing transactions from interacting with one another in uncontrolled ways. Transactions are designed to make database changes in such a way that the database, as a whole, moves from one consistent state to another.

Not only must transactions leave the database in a consistent state upon completion, but transactions must also see the database in a consistent state when they begin. This condition is difficult to satisfy because there may be concurrently executing transactions, each of which may be causing a temporary inconsistency visible only within that single transaction. Consequently, transactions must not be able to see the changes made by concurrently executing transactions until those transactions commit (i.e. terminate and make their changes permanent).

One approach to ensure that transactions do not see changes made by concurrently executing transactions is to prevent transactions from reading a data item that has been updated until the transaction that updated the data item commits. However, this approach reduces the concurrency in the system by causing transactions that wish to read data items (readers) to wait for transactions that have written to data items (writers) to commit.

An alternate approach to ensure that transactions see a consistent view of the database is to provide a mechanism that allows a reader transaction to see a version of the data item that does not include the updates made by any uncommitted transaction. However, in systems that provide a less-than-newest version of a data item, it is not always apparent which versions of a data item can and cannot be supplied to a transaction. Further, among those versions of a data item that can be supplied to a transaction, some versions will consume more overhead to supply than other versions.

Based on the foregoing, it is desirable to provide a mechanism for determining which versions of a data item may be supplied to a transaction. It is further desirable to provide a mechanism that selects the versions of data items to supply to transactions in a way that reduces the overhead required to supply the version of the data item. Specifically, it is desirable to select versions that require less overhead to construct, while still ensuring that the versions seen are recent enough.

SUMMARY OF THE INVENTION

According to one aspect of the invention, a method for is provided for selecting a version of a data item to be provided to a transaction executing on a distributed database system. The method includes the steps of determining version criteria based on which location of a plurality of locations in the distributed database system is associated with the data item and which location of the plurality of locations in the distributed database system is the location at which the transaction is executing. A version of the data item to be provided to the transaction is selected based upon the version criteria.

According to another aspect of the invention, the method includes the step of generating a MUST SEE time and a CANNOT SEE time for each of the plurality of locations. In this situation, the step of selecting, based upon the version criteria, a version of the data item to be provided to the transaction, includes the step of selecting, based upon a particular MUST SEE time and a particular CANNOT SEE time for the location associated with the data item, a version of the data item to be provided to the transaction.

According to yet another aspect of the invention, the step of determining version criteria includes the step of determining a base snapshot time for the location where the transaction is executing and a delta snapshot time for the location associated with the data item. In this situation, the step of selecting, based upon the version criteria, a version of the data item to be provided to the transaction includes the step of selecting, based upon the base snapshot time and the delta snapshot time, a version of the data item to be provided to the transaction.

BRIEF DESCRIPTION OF THE DRAWINGS

Embodiments of the invention are illustrated by way of example, and not by way of limitation, in the figures of the accompanying drawings and in which like reference numerals refer to similar elements and in which:

FIG. 8 is a flow chart that illustrates a method for managing access to data in a distributed database environment according to an embodiment of the invention.

DETAILED DESCRIPTION OF THE PREFERRED EMBODIMENT

A method and apparatus for supplying data items from a database to transactions is described. In the following description, for the purposes of explanation, numerous specific details are set forth in order to provide a thorough understanding of the invention. It will be apparent, however, to one skilled in the art that the invention may be practiced without these specific details. In other instances, well-known structures and devices are shown in block diagram form in order to avoid unnecessarily obscuring the invention.

Hardware Overview

Figure 1:
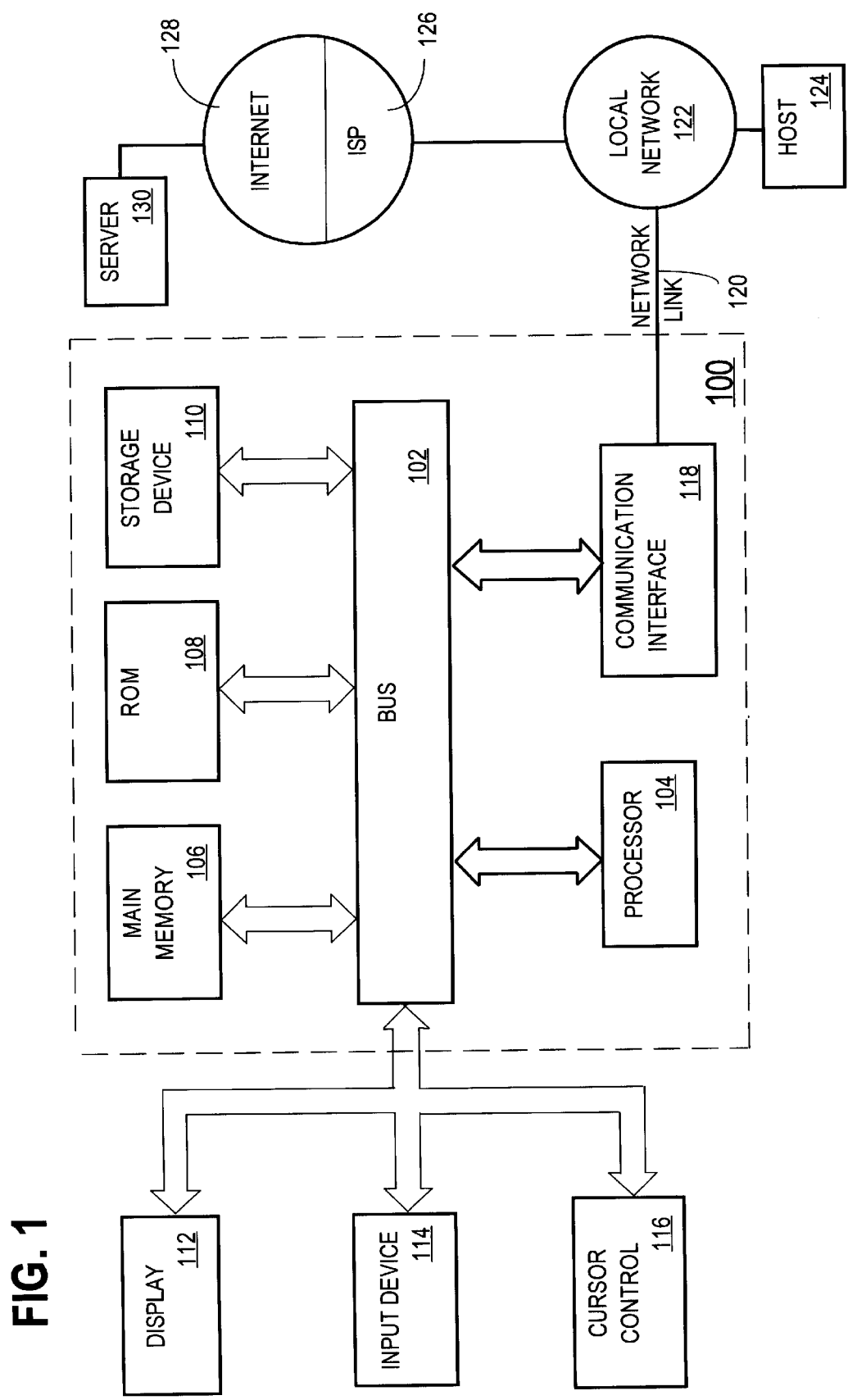
FIG. 1 is a block diagram of a computer system that may be used to implement an embodiment of the invention.

FIG. 1 is a block diagram that illustrates a computer system 100 upon which an embodiment of the invention may be implemented. Computer system 100 includes a bus 102 or other communication mechanism for communicating information, and a processor 104 coupled with bus 102 for processing information. Computer system 100 also includes a main memory 106, such as a random access memory (RAM) or other dynamic storage device, coupled to bus 102 for storing information and instructions to be executed by processor 104. Main memory 106 also may be used for storing temporary variables or other intermediate information during execution of instructions to be executed by processor 104. Computer system 100 further includes a read only memory (ROM) 108 or other static storage device coupled to bus 102 for storing static information and instructions for processor 104. A storage device 110, such as a magnetic disk or optical disk, is provided and coupled to bus 102 for storing information and instructions.

Computer system 100 may be coupled via bus 102 to a display 112, such as a cathode ray tube (CRT), for displaying information to a computer user. An input device 114, including alphanumeric and other keys, is coupled to bus 102 for communicating information and command selections to processor 104. Another type of user input device is cursor control 116, such as a mouse, a trackball, or cursor direction keys for communicating direction information and command selections to processor 104 and for controlling cursor movement on display 112. This input device typically has two degrees of freedom in two axes, a first axis (e.g., x) and a second axis (e.g., y), that allows the device to specify positions in a plane.

The invention is related to the use of computer system 100 for selecting a particular version of a data item to be provided to a transaction. According to one embodiment of the invention, the selection of a particular version of a data item to be provided to a transaction is performed by computer system 100 in response to processor 104 executing one or more sequences of one or more instructions contained in main memory 106. Such instructions may be read into main memory 106 from another computer-readable medium, such as storage device 110. Execution of the sequences of instructions contained in main memory 106 causes processor 104 to perform the process steps described herein. One or more processors in a multi-processing arrangement may also be employed to execute the sequences of instructions contained in main memory 106. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 104 for execution. Such a medium may take many forms, including but not limited to, non-volatile media, volatile media, and transmission media. Non-volatile media includes, for example, optical or magnetic disks, such as storage device 110. Volatile media includes dynamic memory, such as main memory 106. Transmission media includes coaxial cables, copper wire and fiber optics, including the wires that comprise bus 102. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 104 for execution. For example, the instructions may initially be carried on a magnetic disk of a remote computer. The remote computer can load the instructions into its dynamic memory and send the instructions over a telephone line using a modem. A modem local to computer system 100 can receive the data on the telephone line and use an infrared transmitter to convert the data to an infrared signal. An infrared detector coupled to bus 102 can receive the data carried in the infrared signal and place the data on bus 102. Bus 102 carries the data to main memory 106, from which processor 104 retrieves and executes the instructions. The instructions received by main memory 106 may optionally be stored on storage device 110 either before or after execution by processor 104.

Computer system 100 also includes a communication interface 118 coupled to bus 102. Communication interface 118 provides a two-way data communication coupling to a network link 120 that is connected to a local network 122. For example, communication interface 118 may be an integrated services digital network (ISDN) card or a modem to provide a data communication connection to a corresponding type of telephone line. As another example, communication interface 118 may be a local area network (LAN) card to provide a data communication connection to a compatible LAN. Wireless links may also be implemented. In any such implementation, communication interface 118 sends and receives electrical, electromagnetic or optical signals that carry digital data streams representing various types of information.

Network link 120 typically provides data communication through one or more networks to other data devices. For example, network link 120 may provide a connection through local network 122 to a host computer 124 or to data equipment operated by an Internet Service Provider (ISP) 126. ISP 126 in turn provides data communication services through the world wide packet data communication network now commonly referred to as the "Internet" 128. Local network 122 and Internet 128 both use electrical, electromagnetic or optical signals that carry digital data streams. The signals through the various networks and the signals on network link 120 and through communication interface 118, which carry the digital data to and from computer system 100, are exemplary forms of carrier waves transporting the information.

Computer system 100 can send messages and receive data, including program code, through the network(s), network link 120 and communication interface 118. In the Internet example, a server 130 might transmit a requested code for an application program through Internet 128, ISP 126, local network 122 and communication interface 118. In accordance with the invention, one such downloaded application provides for selecting a particular version of a data item to be provided to a transaction as described herein.

The received code may be executed by processor 104 as it is received, and/or stored in storage device 110, or other non-volatile storage for later execution. In this manner, computer system 100 may obtain application code in the form of a carrier wave.

CONSISTENT READ MODE

One approach to avoiding undesirable interaction between concurrent transactions is referred to herein as performing the transactions in "Consistent Read Mode". Consistent Read Mode is characterized by two rules. First, every statement executed by a Consistent Read Mode transaction sees only (1) changes that were committed to the database by a particular set of committed transactions and (2) changes made by prior statements of the transaction itself. This set of transactions whose changes are visible to a statement is referred to as its "snapshot set". This isolates transactions that are issuing reads from the changes made by excluded transactions that are concurrently issuing writes. Second, an updating transaction locks the rows it writes, and holds those locks until it commits. A lock on any given row may be held by only one transaction at a time. A row, as the term is used herein, refers to an exclusive set of one or more associated data elements.

SNAPSHOTS

A Consistent Read Mode transaction requires that statements see "snapshots" of the database. A statement's snapshot includes all changes made by the transactions in its snapshot set, and none of the changes made by any transactions that are not in its snapshot set ("excluded transactions").

The DBMS may allow changes to be made by excluded transactions before the Consistent Read Mode statement has been completely processed. After such changes have been made to the database, the database no longer reflects the version of the data that must be presented to the Consistent Read Mode statement. Consequently, systems that implement Consistent Read Mode must either disallow changes while Consistent Read Mode statements are in progress, or include a mechanism for providing to Consistent Read Mode statements the version of the data that existed in their snapshots.

The simplest way to provide snapshots of a database would be to make a copy of the database at a "snapshot time" (which must be at a time when no updating transactions are in progress). The snapshot set would consist of all transactions that had committed as of the snapshot time. A Consistent Read Mode statement would be assigned a particular snapshot time. Each Consistent Read Mode statement would simply be supplied data from the copy of the database that was made at its assigned snapshot time, rather than the current version of the database. While this solution is simple, the quantity of storage space and computational resources required to take and maintain the snapshots makes it impractical.

In an alternate approach, the database system "reconstructs" data accessed by a Consistent Read Mode statement by removing from the current data those changes made to the data by transactions not in the statement's snapshot set. Such an approach is described in U.S. patent application Ser. No. 08/613,026 entitled "METHOD AND APPARATUS FOR PROVIDING ISOLATION LEVELS IN A DATABASE SYSTEM", filed by Bamford et al. on Mar. 11, 1996 (hereinafter referred to as "Bamford"). The invention is not limited to any particular mechanism for reconstructing versions of data.

USING RULES TO ESTABLISH STATIC SNAPSHOT SETS

As explained above, every statement of a Consistent Read Mode transaction must be supplied data that (1) reflects all of the changes made by transactions in the snapshot set of the statement, and (2) does not reflect any changes made by transactions excluded from the snapshot set. However, these Consistent Read Mode rules do not dictate which committed transactions should be included in the snapshot set of a given Consistent Read Mode statement.

To establish the snapshot sets for Consistent Read Mode statements, a database system may simply establish a set of rules to assign static snapshot sets based on execution times. For example, a database system may adopt the rule that all transactions are assigned a "snapshot time." The transactions are then restricted to seeing all changes made by transactions that committed at or before their snapshot time, and none of the changes made by transactions that committed after their snapshot time. The rule may further state, for example, that the snapshot time assigned to a transaction is the time that a transaction begins execution. Alternatively, in order to support a transaction consistency mode referred to as "serializable" in which all statements of a transaction see the same versions of data, the database system might adopt the rule that the snapshot set of the statements of a serializable transaction would consist of all transactions that had committed as of the beginning of the transaction. Serializable mode is described in detail in Bamford.

The snapshot sets established by such rules are static in that the membership of the snapshot set is fixed at the time the statement or transaction begins and cannot be changed during its execution.

SNAPSHOT PROLIFERATION

The static snapshot set approach described above does not always produce the most efficient use of database resources. Specifically, the use of static snapshot sets tends to increase the number of versions of data that are in use at any given time. This tendency is referred to herein as "snapshot proliferation". To support more versions of the same data, more "reconstruction" operations must be performed and more buffer space is required to store different versions of the same set of data. An example of snapshot proliferation shall now be given with reference to FIG. 2.

Figure 2:
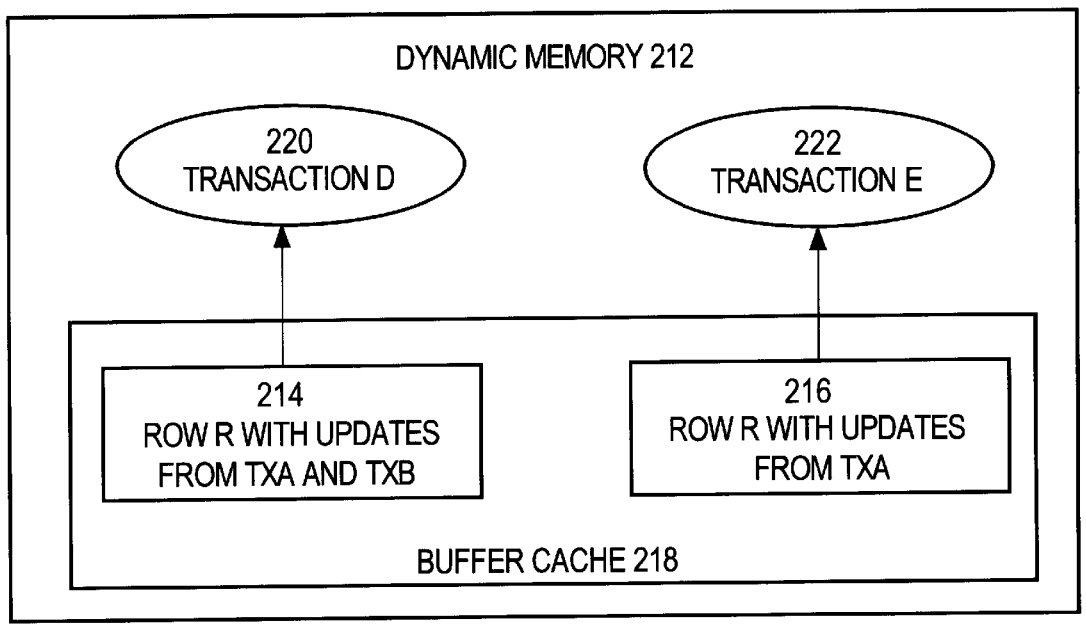
FIG. 2 is a block diagram of a computer system in which two transactions are supplied two different versions of a data item.
Figure 2:
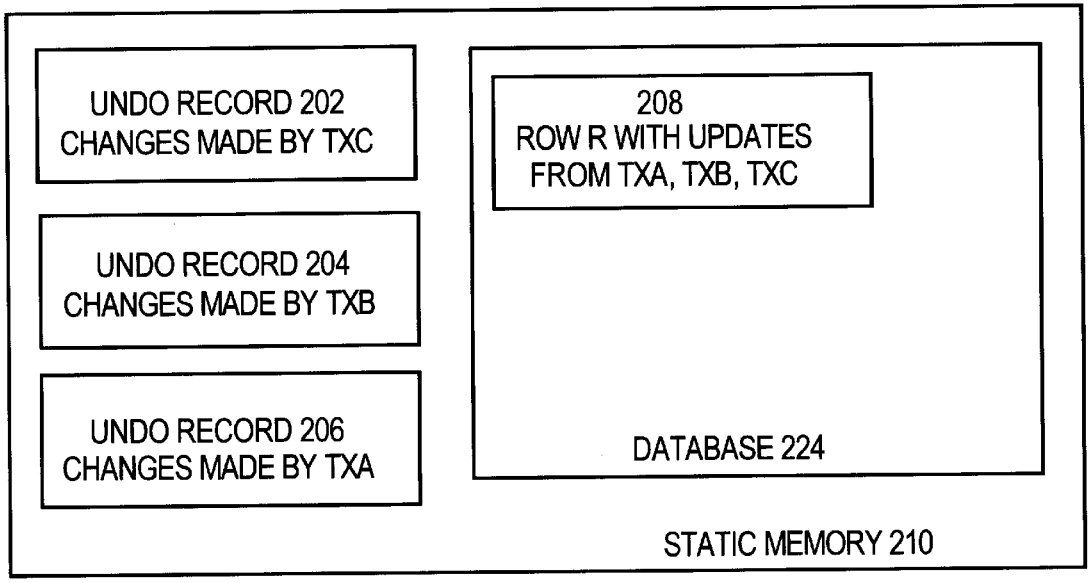

Referring to FIG. 2, it illustrates a database system 200 that includes a database 224 stored on static memory 210, such as a magnetic or optical disk. The database includes a version of a row R 208 that has been updated by three transactions, TXA, TXB, and TXC, in that order. Every time row R was updated, an undo record was generated that identifies the transaction that performed the update and includes information about how to undo the update. In the illustrated example, undo records 202, 204 and 206 are undo records for the updates made to row R by transactions TXC, TXB and TXA, respectively. The version of row R that is stored in the database shall be referred to as version 1.

Database system 200 includes dynamic memory 212 in which two serializable transactions D 220 and transaction E 222 are concurrently executing. It shall be assumed that both transactions D and E contain statements to read row R. It shall also be assumed that transaction D began execution after transactions TXA and TXB committed, but before TXC committed, and that transaction E began execution after transaction TXA committed, but before TXB and TXC committed.

In response to the statement of traction D, a reconstruction mechanism in the database system 200 reconstructs a version of row R that reflects updates made by transactions TXA and TXB, but not the update made by transaction TXC. The reconstruction mechanism could perform this by applying the undo record 202 to the version of row R 208 that is stored in the database 224. For the purposes of explanation, the version of row R that reflects updates made by TXA and TXB, but not the update made by TXC, shall be referred to as "version 2" of row R. The database system would load version 2 of row R into a buffer cache 218 in dynamic memory 212. Transaction D would then read version 2 of row R 214 from the buffer cache 218.

In response to the statement of transaction E, the reconstruction mechanism of the database system 200 would reconstruct a version of row R that reflects updates made by TXA, but not the updates made by TXB or TXC. The reconstruction mechanism could perform this by applying the undo records 202 and 204 to the version of row R 208 that is stored in the database 224. For the purposes of explanation, the version of row R that reflects updates made by TXA, but not the updates made by TXB or TXC, shall be referred to as "version 3" of row R. The database system would load version 3 of row R into the buffer cache 218 in dynamic memory 212. Transaction E would then read version 3 of row R 716 from the buffer cache 218.

In the above example, a separate reconstruction operation was performed for each of transactions D and E, and two versions of row R were stored in the buffer cache. However, there may be no compelling reason for the changes made by TXC to be hidden from transaction D. If transaction D is allowed to see the changes made by TXC, then the reconstruction operation required to create version 2 of row R would not be necessary.

Further, there may be no compelling reason for the changes made by TXC or TXB to be hidden from transaction E. If transaction E is allowed to see the changes made by TXC and TXB, then transactions D and E can share version 1. If transaction E is allowed to use version 1 of row R, one less reconstruction operation would be required, and one less buffer in the buffer cache would be required. However, the inflexibility resulting from a static snapshot mechanism would require the reconstruction and storage of versions 2 and 3.

DYNAMIC SNAPSHOT SET ADJUSTMENT

To ensure that a serializable transaction sees a consistent view of the database, the following rules must be followed: (1) if a change made by a transaction is reflected in data that has been supplied to a serializable transaction, then the serializable transaction must always see the changes made by the transaction, and (2) if a change made by a transaction has been removed from data that has been supplied to the serializable transaction, then all changes made by the transaction must be removed from data supplied to the serializable transaction.

According to one embodiment of the invention, a snapshot tracking mechanism is provided that increases the flexibility of the snapshot mechanism by allowing the membership of a snapshot set of a serializable transaction to be dynamically adjusted during execution of the serializable transaction without violating the Consistent Read Mode rules. By allowing the snapshot set associated with a serializable transaction to be dynamically adjusted, snapshot proliferation may be reduced by adjusting snapshot sets to allow the same version of data to be shared among multiple serializable transactions.

THE SNAPSHOT ADJUSTMENT MECHANISM

According to one embodiment of the invention, two transaction sets are maintained for each serializable transaction. The transaction sets include a MUST-SEE set, and a CANNOT-SEE set. The MUST-SEE set includes all of the transactions that made updates that have been seen by the serializable transaction. The CANNOT-SEE set includes all of the transactions that made updates that were removed from data that has been seen by the serializable transaction and all transactions that subsequently update the seen data.

Before a serializable transaction accesses data, all transactions, including transactions that begin execution after the serializable transaction, may potentially be in the snapshot set of the serializable transaction. Consequently, the MUST-SEE and CANNOT-SEE sets are empty.

When a serializable transaction accesses data, the database system makes a decision with respect to which version of the data to supply to the serializable transaction. The database system may take into account a variety of considerations when determining which version of a data item to supply to a serializable transaction, including which versions are stored locally, which versions are stored remotely, and which versions reflect the most recent changes. Various techniques for determining which version of a data item to supply to a transaction shall be described in greater detail below.

Regardless of how a version is selected, once a version of a data item is supplied to a serializable transaction, all transactions that have updated or will update the data item are assigned to either the MUST-SEE set or the CANNOT-SEE set of the serializable transaction. Specifically, all transactions that made updates that were not removed from the version of the data item supplied to the serializable transaction are placed in the MUST-SEE set of the serializable transaction. All transactions that made updates that were removed from the version of the data supplied to the serializable transaction or that subsequently update the seen data are placed in the CANNOT-SEE set of the serializable transaction.

When the MUST-SEE and CANNOT-SEE sets of a serializable transaction are not empty, the database system is limited with respect to which versions of data may be supplied to the serializable transaction. Specifically, the database system may not supply a serializable transaction any version of any data item that either (1) reflects updates made by transactions that belong to the CANNOT-SEE set of the serializable transaction, or (2) has had removed from it any updates made by transactions in the MUST-SEE set of the serializable transaction. As long as neither of these two restrictions are violated, the database system may supply any version of a data item dictated by efficiency considerations that shall be discussed hereafter.

UPDATE TRACKING MECHANISM

As mentioned above, a serializable transaction cannot be supplied a version of a data item that reflect updates from "cannot see" transactions or from which updates made by "must see" transactions have been removed. Consequently, a mechanism must be provided to track (1) which transactions have made updates that are reflected in a particular version of a data item, (2) which transactions have made updates that have been removed from a particular version of a data item, and (3) which transaction make updates to a data item after it has been read by the serializable transaction.

For the version of a data item that is stored in the database, the undo records provide a history of which transactions have performed updates that are reflected in the data For example, by inspecting undo records 202, 204 and 206, a database system would be able to determine that the version of row R 208 stored in database 224 reflects changes made by transactions TXA, TXB and TXC. However, when a version of row R is reconstructed and stored in buffer cache 218, it is not immediately apparent which transactions which transactions have been included or excluded from the version.

According to one embodiment, the database system includes an update tracking mechanism that stores information to indicate which transactions are included and excluded from reconstructed versions of data. Thus, each version of reconstructed data stored in buffer cache 218 has a corresponding set of "INCLUDED" transactions and a corresponding set of "EXCLUDED" transactions. When the reconstruction mechanism is reconstructing a version of data, the reconstruction mechanism assigns to the "EXCLUDED" transaction set the transactions associated with the undo records that are applied by the reconstruction mechanism to create the version. The reconstruction mechanism assigns to the "INCLUDED" transaction set the transactions associated with the undo records that are not applied by to create the version.

For example, the reconstruction mechanism created the version 2 of row R (the version stored in buffer 214) by applying undo record 202 to version 1 of row R (the version stored in database 224). In creating version 2, the reconstruction mechanism did not apply undo records 204 and 206. Consequently, the transaction associated with undo record 202 (TXC) would be assigned to the EXCLUDED set of version 2, and the transactions associated with undo records 204 and 206 (TXB and TXA) would be assigned to the INCLUDED set of version 2.

By tracking the INCLUDED and EXCLUDED set of every version of data, the database system may determine whether a particular version of data may be supplied to a particular serializable transaction by comparing the INCLUDED set of a version against the CANNOT-SEE set of the serializable transaction and the EXCLUDED set of the version against the MUST-SEE set of the serializable transaction. Specifically, a serializable transaction may be supplied a particular version of data if and only if ((MS ∩EX)∪(CS∩INC))=Ø, where MS is the MUST-SEE set of the serializable transaction, EX is the EXCLUDED set of the version, CS is the CANNOT-SEE set of the serializable transaction, and INC is the INCLUDED set of the version.

SNAPSHOT ADJUSTMENT EXAMPLE

Figure 3A:
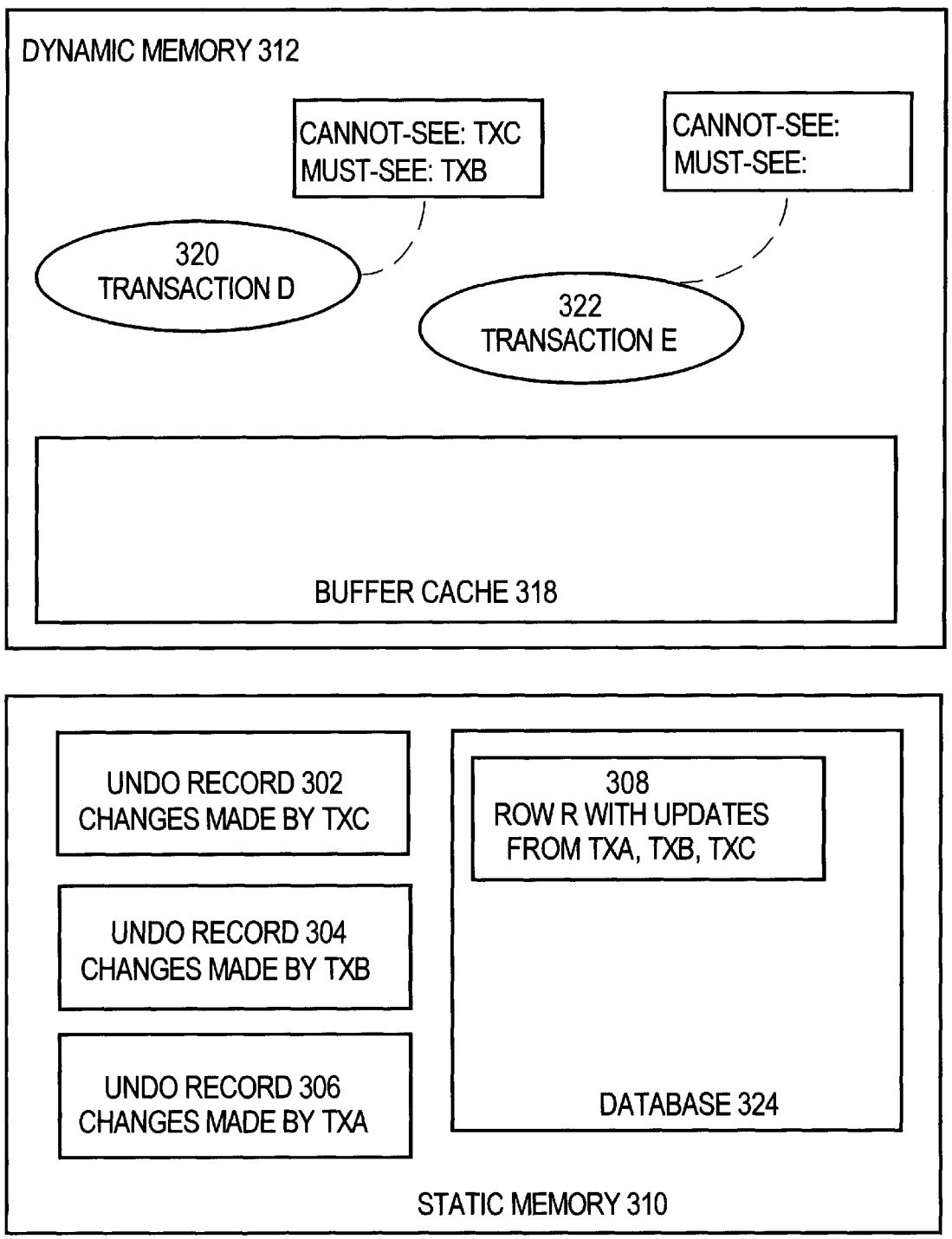
FIG. 3A is a block diagram of a computer system in which snapshot set data is maintained for each transaction according to an embodiment of the invention.
Figure 3B:
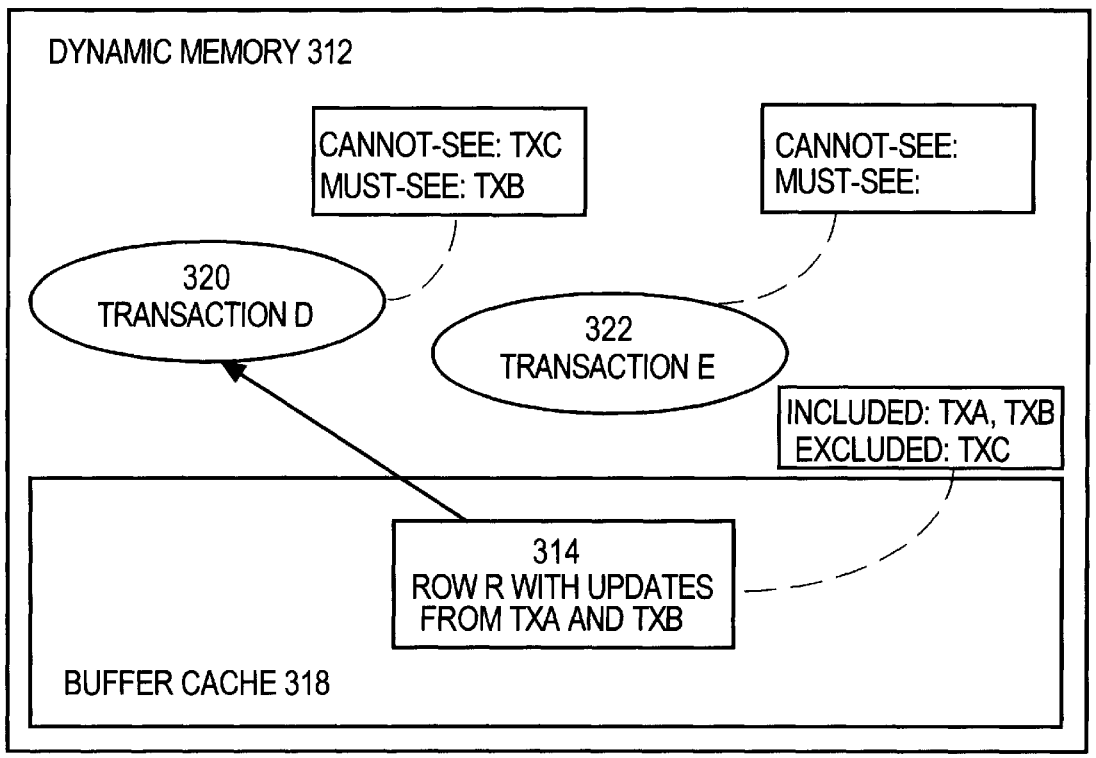
FIG. 3B illustrates supplying a version of a data item to a transaction in the computer system of FIG. 3A.
Figure 3B:
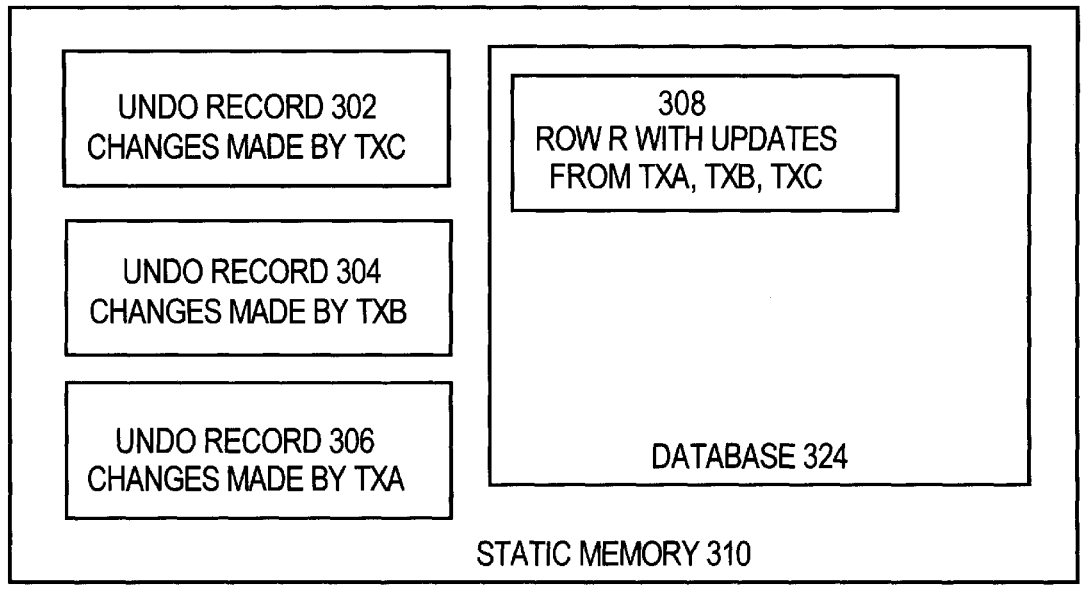
Figure 3C:
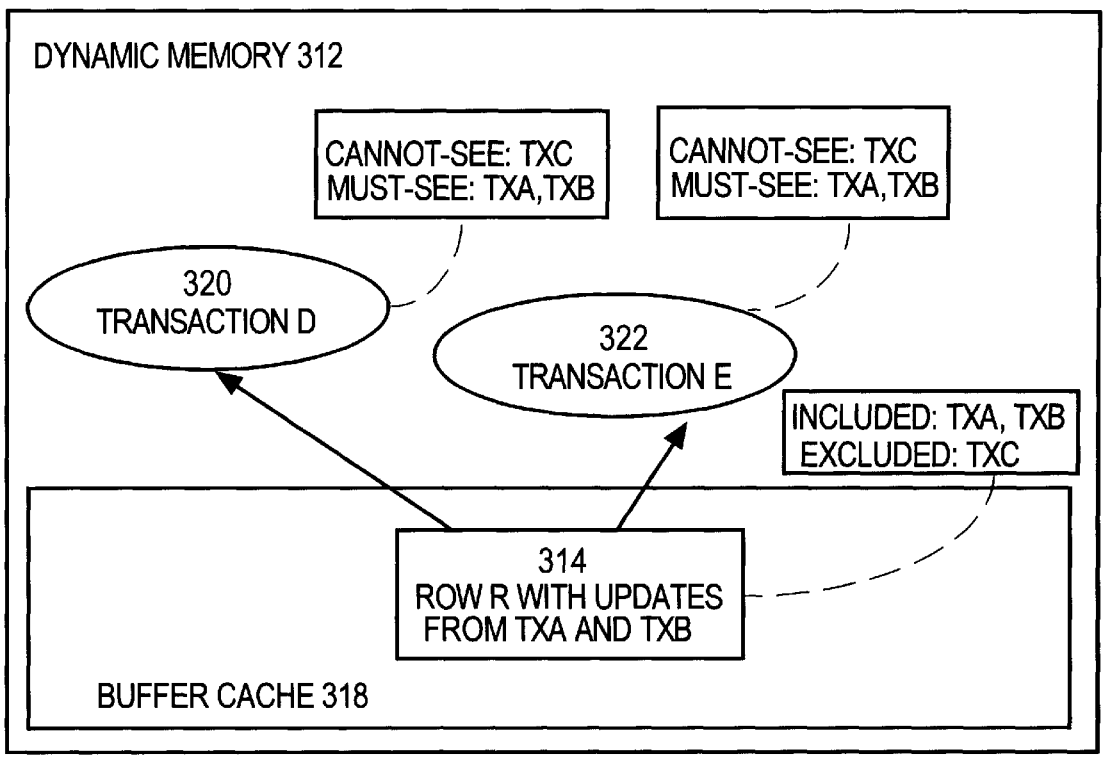
FIG. 3C illustrates sharing a version of a data item between two transactions in the computer system of FIG. 3A.
Figure 3C:
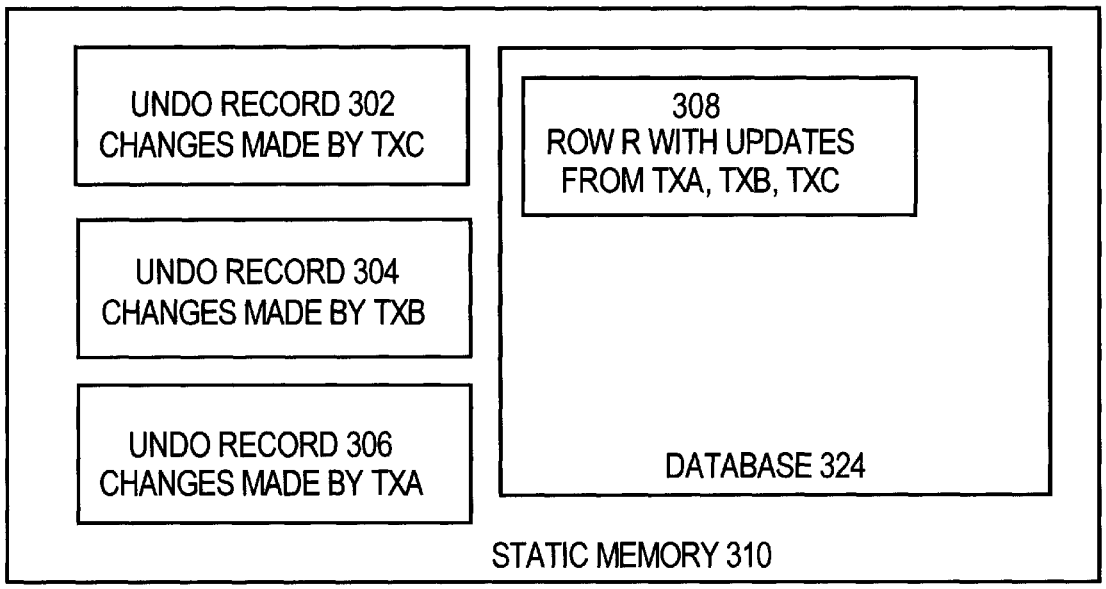

FIGS. 3A–3C illustrate a database system 300 in which the snapshot set associated with a serializable transaction can be dynamically adjusted, as described above. Database system 300 includes a database 324 in which is stored one version of row R 308. The version of row R that is stored in database 324 has been updated by transactions TXA, TXB and TXC, in that order. Undo records for the changes made by TXA, TXB and TXC are stored on static memory 310 as undo records 306, 304, and 302, respectively.

Dynamic memory 312 includes a buffer cache 318 and two active serializable transactions, transaction D 320 and transaction E 322. Associated with each of the active serializable transactions is a CANNOT-SEE set and a MUST-SEE set. In the illustrated embodiment, the CANNOT-SEE set of transaction D includes TXC, and the MUST-SEE set of transaction D includes TXB. This condition indicates that transaction D has previously accessed data that had been updated by TXB and TXC. The version of the data that was supplied to transaction D included the update made by TXB, but did not include the update made by TXC.

Both the MUST-SEE set and the CANNOT-SEE set associated with transaction E are empty, indicating that transaction E has not yet accessed any data that has been modified by any other transaction. Assume that both transaction D and transaction E issue statements to read row R.

In response to the statement issued by transaction D, the database system may first attempt to supply to transaction D a version of row R that does not require reconstruction. In the illustrated example, buffer cache 318 does not currently hold any version of row R. The only version of row R that currently exists is the version of row R stored in database 324. To determine whether transaction D may use the version of row R stored in database 324, the database system determines whether any of the transactions in the INCLUDED set of version 308 of row R are in the CANNOT-SEE set of transaction D, and whether any of the transactions in the EXCLUDED set of version 308 of row R are in the MUST-SEE set of transaction D.

In the illustrated example, the INCLUDED set of version 308 of row R includes TXA, TXB and TXC. The EXCLUDED set of version 308 of row R is empty. Because TXC is in both the INCLUDED set of version 308 and the CANNOT-SEE set of transaction D, transaction D cannot use version 308 of row R. Since no other versions of row R are available, the reconstruction mechanism must create a new version 314 of row R, as shown in FIG. 3b.

The reconstruction mechanism creates version 314 of row R by applying undo record 302 to version 308 of row R. The reconstruction mechanism also stores data to indicate that the included list of version 314 of row R includes TXA and TXB, while the excluded list of version 314 of row R includes TXC. After version 314 of row R has been created, it is stored in a buffer within buffer cache 318, and supplied to transaction D in response to the statement.

In response to supplying transaction D with version 314 of row R, the CANNOT-SEE and MUST-SEE sets of transaction D are updated. Specifically, any transaction in the INCLUDED set of version 314 is added to the MUST-SEE set of transaction D. Any transaction in the EXCLUDED set of version 314 is added to the CANNOT-SEE set of transaction D. In the present example, TXC already belongs to the CANNOT-SEE set of transaction D, and TXB already belongs to the MUST-SEE set of transaction D. Therefore, the only update required is the addition of TXA to the MUST-SEE set of transaction D.

In response to the statement issued by transaction E, the database system determines whether transaction E may be supplied a version of row R that does not require reconstruction. In the illustrated example of FIG. 3b, version 314 of row R is stored in buffer cache 318, and version 308 of row R is stored in database 324. Because the CANNOT-SEE and MUST-SEE sets of transaction E are currently empty, the database system may supply either of the available versions to transaction E. However, if version 308 is supplied to transaction E, an additional buffer within buffer cache 318 would have to be used. Therefore, to preserve buffer space, the database system 300 may determine that it is more efficient to supply version 314 of row R to transaction E.

In response to supplying transaction E with version 314 of row R, the CANNOT-SEE and MUST-SEE sets of transaction E are updated. Specifically, any transaction in the INCLUDED set of version 314 is added to the MUST-SEE set of transaction E. Any transaction in the EXCLUDED set of version 314 is added to the CANNOT-SEE set of transaction E. In the present example, TXC is added to the CANNOT-SEE set of transaction D, and TXA and TXB are added to the MUST-SEE set of transaction E. The status of database system 300 after supplying version 314 to both transactions D and E is illustrated in FIG. 3C.

INCLUDED SET APPROXIMATION MECHANISM

In the foregoing discussion, for the purposes of explanation, the INCLUDED set associated with a version of data and the MUST-SEE set associated with a serializable transaction are indicated by lists of transaction identifiers. However, it will often be impractical to store the members of these sets in a list format. For example, during the life of a database, a particular data item may be updated by millions of transactions. These million transactions would belong to the INCLUDED set or the EXCLUDED set of every version of the data item, and would have to be added to the MUST-SEE set or the CANNOT-SEE set of every transaction that accesses the data item. It would be impractical to maintain million-element lists to track the members of these sets.

According to one embodiment of the invention, the need to store vast amounts of data for INCLUDED sets is avoided by assuming that the INCLUDED set of a data item includes all transactions that committed before the most recently committed transaction that updated the data item. Using this assumption, the INCLUDED set of a data item may be represented by a single value, referred to herein as an "include-time". The include-time of a version of a data item is the commit time of the most recently committed transaction whose updates are reflected in the version of the data item.

For example, assume that a version 1 a data item X was updated by transactions TXA, TXB and TXC. TXA committed at time T, TXB committed at time T+1, and TXC committed at time T+2. Based on the assumption set forth above, all transactions that committed at or before time T+2 are considered to be in the INCLUDED set of version 1 of data item X. Consequently, T+2 is the "include-time" of version 1 of data item X.

Assume that a reconstruction mechanism creates a version 2 of data item X, where the update made by TXC has been removed. Under these circumstances, TXB was the most recently committed transaction whose updates are reflected in version 2 of data item X. Consequently, the "include-time" of version 2 of data item X would be T+1. All transactions that committed before T+1 would be members of the INCLUDED set of version 2 of data item X. TXC would be a member of the EXCLUDED set of version 2 of data item X.

By storing the "include-time" of a version, a database system may determine whether a given transaction is a member of the INCLUDED set represented by the include time by comparing the include time to the commit time of the transaction. Specifically, if the commit time of a transaction is less than or equal to an include time, then the transaction is a member of the INCLUDED set represented by the include time. Conversely, if the commit time of a transaction is greater than an include time, then the transaction is not a member of the INCLUDED set represented by the include time.

As mentioned above, a serializable transaction cannot be supplied a particular version of a data item if any member of its CANNOT-SEE set is a member of the INCLUDED set of the particular version of the data item. In an embodiment that uses include times to represent INCLUDED sets, the database system may make this determination simply by determining whether any transaction in the CANNOT-SEE set committed before the included time of the version of the data item.

MUST-SEE SET APPROXIMATION MECHANISM

Similar to INCLUDED sets, MUST-SEE sets may include millions of transactions. According to one embodiment of the invention, a MUST-SEE set is represented by a MUST-SEE time. All transactions that committed at or before a MUST-SEE time are considered to be in the MUST-SEE set represented by the MUST-SEE time. Consequently, a serializable transaction must see all changes made by all transactions that committed at or before the MUST-SEE time associated with the serializable transaction.

As mentioned above, when a version of a data item is supplied to a serializable transaction, all of the members of the INCLUDED set associated with the version are added to the MUST-SEE set of the serializable transaction. In an embodiment that uses include times and MUST-SEE times, this is performed by setting the MUST-SEE time associated with the serializable transaction to the include time associated with the version supplied to the serializable transaction when the included time is greater (later) than the MUST-SEE time. That is, NMST=MAX( OMST, IT), where NMST is the new MUST-SEE time of the serializable transaction, OMST is the old MUST-SEE time of the serializable transaction, and IT is the include time of the version of data that is supplied to the serializable transaction.

By storing the MUST-SEE of a serializable transaction, a database system may determine whether a given transaction is a member of the MUST-SEE set represented by the MUST-SEE time by comparing the MUST-SEE time to the commit time of the transaction. Specifically, if the commit time of a transaction is less than or equal to a MUST-SEE time, then the transaction is a member of the MUST-SEE set represented by the MUST-SEE time. Conversely, if the commit time of a transaction is greater than a MUST-SEE time, then the transaction is not a member of the MUST-SEE set represented by the MUST-SEE time.

As mentioned above, a serializable transaction cannot be supplied a particular version of a data item if any member of its MUST-SEE set is a member of the EXCLUDED set of the particular version of the data item. In an embodiment that uses MUST-SEE times to represent MUST-SEE sets, the database system may make this determination simply by determining whether any transaction in the "EXCLUDED" set committed before the MUST-SEE time of the serializable transaction.

EXCLUDED SET APPROXIMATION

The EXCLUDED set of a version of a data item includes both (1) those transactions whose updates have been removed from the version of the data item, and (2) those transactions that subsequently update the data item. The set of transactions whose updates are removed from a version during a reconstruction operation will be relatively small, and therefore each transaction in the set may be specifically identified. In contrast, the set of transactions that subsequently update the data item may be infinitely large. Therefore, the set of transactions that subsequently update the data item must be approximated.

Significantly, none of the transactions that subsequently update a data item can be committed at the time a version of the data item is reconstructed. Conversely, all of the transactions that have not committed at the time a version of the data item is reconstructed may potentially update the data item in the future. Therefore, all transactions that are not committed at the time a version of a data item is reconstructed are assumed to be in the EXCLUDED set of that version of the data item. The portion of the EXCLUDED set that is associated transactions that will perform future updates may therefore be represented by storing the time a version of a data item is reconstructed (the "exclude time") with the reconstructed version of the data item.

CANNOT-SEE SET APPROXIMATION MECHANISM

Similar to EXCLUDED sets, CANNOT-SEE sets include a potentially infinite number of transactions. According to one embodiment of the invention, the portion of a CANNOT-SEE set that corresponds to future transactions is represented by a CANNOT-SEE time. All transactions that committed at or after a CANNOT-SEE time are considered to be in the CANNOT-SEE set represented by the CANNOT-SEE time. Consequently, a serializable transaction cannot see changes made by any transactions that commit at or after the CANNOT-SEE time associated with the serializable transaction.

As mentioned above, when a version of a data item is supplied to a serializable transaction, all of the members of the EXCLUDED set associated with the version are added to the CANNOT-SEE set of the serializable transaction. In an embodiment that uses exclude times and CANNOT-SEE times, this is performed by setting the CANNOT-SEE time associated with the serializable transaction to the exclude time associated with the version supplied to the serializable transaction when the exclude time is smaller (earlier) than the CANNOT-SEE time. That is, NCST=MIN(OCST, ET), where NCST is the new CANNOT-SEE time of the serializable transaction, OCST is the old CANNOT-SEE time of the serializable transaction, and ET is the exclude time of the version of data that is supplied to the serializable transaction.

By storing the CANNOT-SEE time of a serializable transaction, a database system may determine whether a given transaction is a member of the CANNOT-SEE set represented by the CANNOT-SEE time by comparing (1) the transaction against any explicitly enumerated transactions in the CANNOT-SEE set and (2) the CANNOT-SEE time no the commit time of the transaction. Specifically, if the commit time of a transaction is greater than or equal to a CANNOT-SEE time, then the transaction is a member of the CANNOT-SEE set represented by the CANNOT-SEE time even though the transaction is not specifically identified in the CANNOT-SEE set. Conversely, if the commit time of a transaction is less than a CANNOT-SEE time, then the transaction is not a member of the CANNOT-SEE set represented by the CANNOT-SEE time unless the transaction is explicitly identified in the CANNOT-SEE set.

As mentioned above, a serializable transaction cannot be supplied a particular version of a data item if any member of its CANNOT-SEE set is a member of the INCLUDED set of the particular version of the data item. In an embodiment that uses CANNOT-SEE times to represent CANNOT-SEE sets, the database system may make this determination simply by determining whether any transaction in the "INCLUDED" set committed after the CANNOT-SEE time of the serializable transaction.

Figure 4:
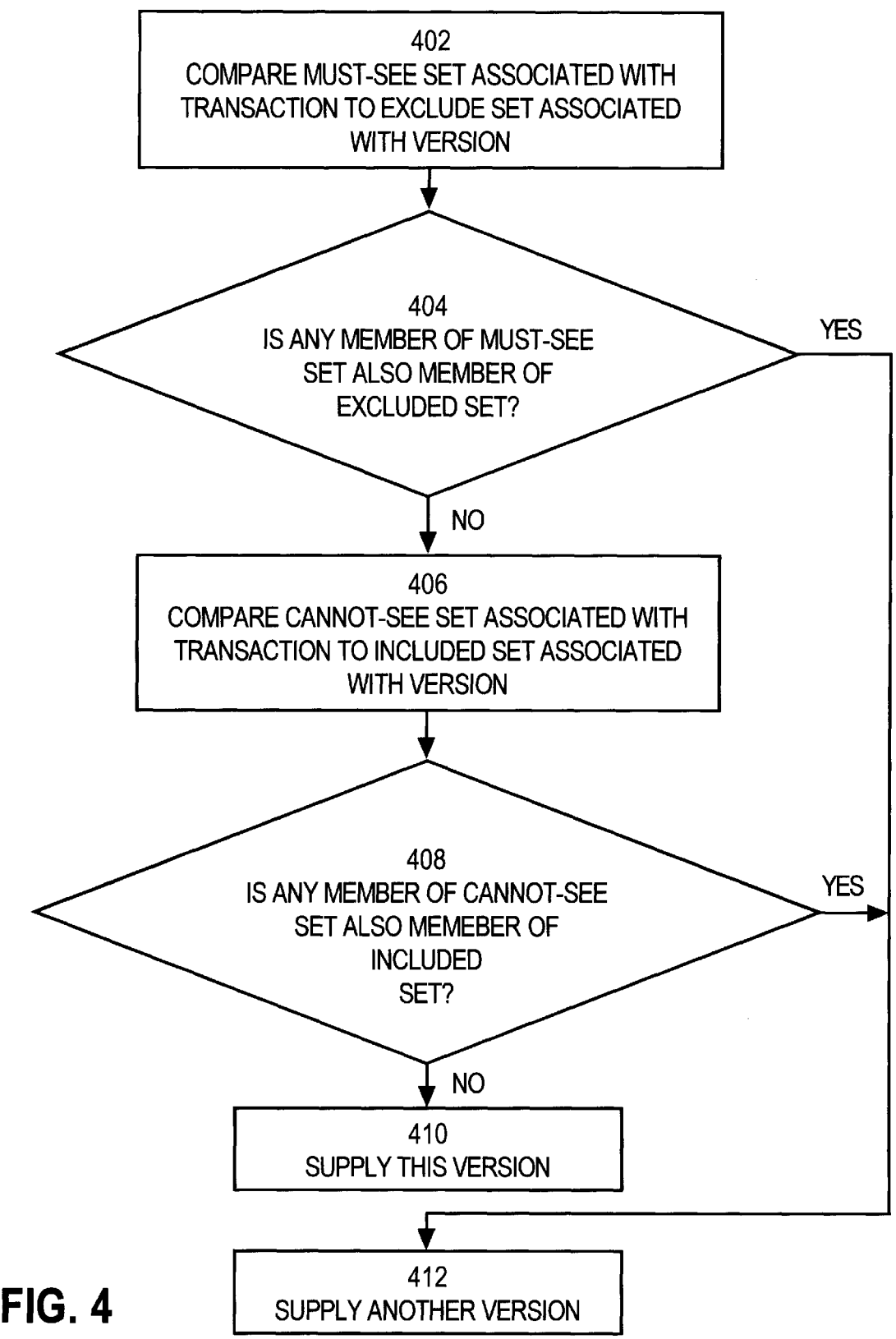
FIG. 4 is a flow chart illustrating steps for determining whether a particular version of a data item may be used by a transaction according to an embodiment of the invention.

Referring to FIG. 4, it is a flow chart illustrating steps for determining whether a particular version of a data item may be used by a transaction according to an embodiment of the invention. At step 402, a MUST-SEE set associated with the transaction is compared to an EXCLUDED set associated with the particular version. As explained above, the MUST-SEE set includes all transactions that have made updates that must be seen by the transaction, and the EXCLUDED set includes all transactions that have made updates to the data item that have been removed from the particular version of the data item or that subsequently make updates to the data. The MUST-SEE set of a transaction may be represented by a MUST-SEE time value, where all transactions that committed prior to the time represented by the MUST-SEE time value are considered to be in the MUST-SEE set. Therefore, the step of comparing a MUST-SEE set associated with the transaction to an EXCLUDED set associated with the particular version may be performed by determining whether any transaction in the EXCLUDED set committed before the time indicated by the MUST-SEE time value.

At step 404, it is determined whether any member of the MUST-SEE set is also a member of the EXCLUDED set. If any member of the MUST-SEE set is also a member of the EXCLUDED set, control proceeds to step 412. Otherwise control proceeds to step 406.

At step 406, a CANNOT-SEE set associated with the transaction is compared to an INCLUDED set associated with the particular version. The CANNOT-SEE set includes all transactions that have made updates that cannot be seen by the transaction, and the INCLUDED set includes all transactions that have made updates that are reflected in the particular version of the data item. As mentioned above, an INCLUDED time value may be used to represent the INCLUDED set, where all transactions that committed prior to the time represented by the INCLUDED time value are considered to be in the INCLUDED set. Therefore, the step of comparing a CANNOT-SEE set associated with the transaction to an INCLUDED set associated with the particular version may be performed by determining whether any transaction in the CANNOT-SEE set committed before the time indicated by the INCLUDED time value.

At step 408, it is determined whether any member of the CANNOT-SEE set is also a member of the INCLUDED set. If any member of the CANNOT-SEE set is also a member of the INCLUDED set, then control proceeds to step 412. Otherwise, control proceeds to step 410.

At step 410, the particular version of the data item is supplied to the transaction. This step is performed if no member of the MUST-SEE set is also a member of the EXCLUDED set, and no member of the CANNOT-SEE set is also a member of the INCLUDED set.

At step 412, a different version of the data item is supplied to the transaction. This step is performed when any member of the MUST-SEE set is also a member of the EXCLUDED set, or any member of the CANNOT-SEE set is also a member of the INCLUDED set.

Figure 5:
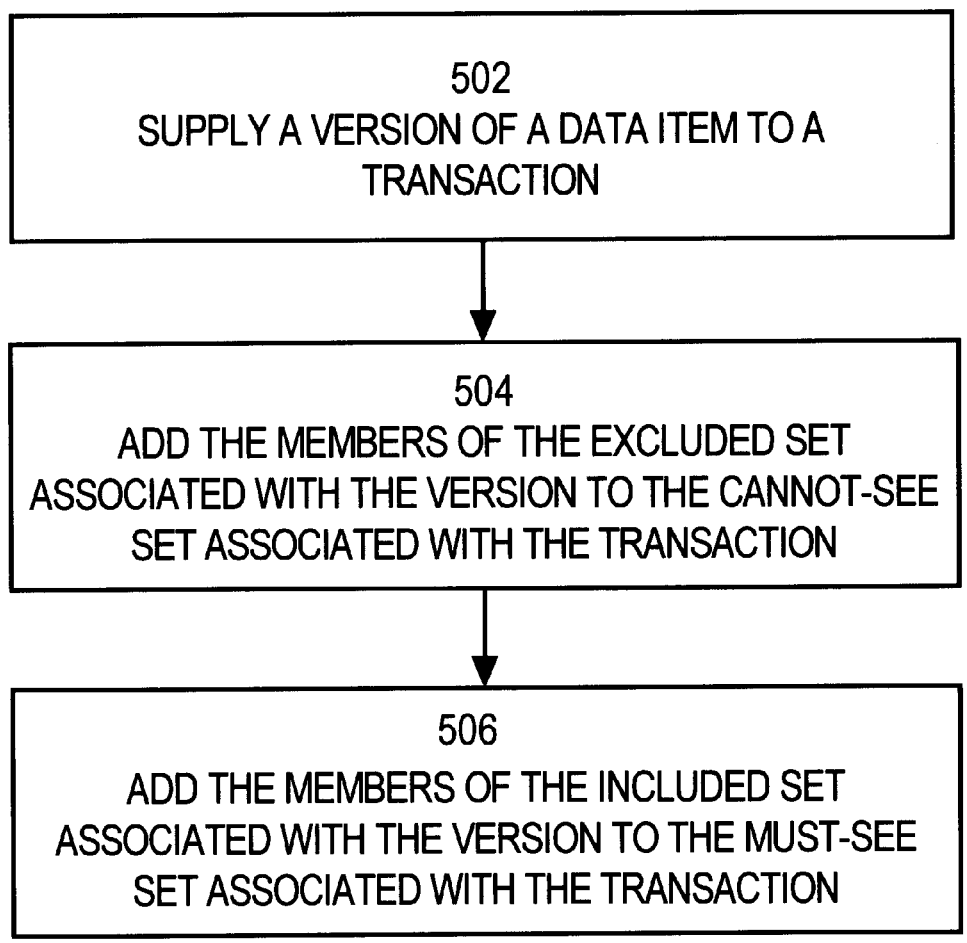
FIG. 5 is a flow chart illustrating the steps performed in response to supplying a particular version of a data item to a transaction, according to one embodiment of the invention.

FIG. 5 is a flow chart illustrating the steps performed in response to supplying a particular version of a data item to a transaction. At step 502 the version of the data item is supplied to the transaction. At step 504, the members of the EXCLUDED set associated with version of the data item are added to the CANNOT-SEE set associated with the transaction. This may be performed by setting the CANNOT-SEE time of the transaction to lesser of the current CANNOT-SEE time and the exclude time associated with the version of the data item, and by adding to the CANNOT-SEE set of the transaction data that identifies any transactions whose changes were removed from the version of the data item.

At step 506, the members of the INCLUDED set associated with the version of the data item are added to the MUST-SEE set associated with the transaction. The step of adding the members of the INCLUDED set to the MUST-SEE set may be performed, for example, by setting the MUST-SEE time value to the greater of the MUST-SEE time value and the INCLUDED time value.

DISTRIBUTED DATABASE ISSUES

In a distributed database environment, transactions sometimes require access to data that is stored on a node other than the node on which the transaction is executing. When a transaction must access data that is not at the same location in which the transaction is executing, additional system resources and time are required to read the data from the other location. In the context of a distributed database system, this problem is referred to as "pinging." A "ping" is said to occur when data stored in the buffer cache of one node is required by a transaction executing on another node in a distributed database system.

A significant amount of system resources and time can be required to make the data that resides in the cache of one node available to the transaction that is executing on another node. Typically, the data must be written from the buffer cache where the data is stored to non-volatile storage, then from the non-volatile storage to the buffer cache on the node where the transaction is executing. Numerous lock-related operations are often required to complete the transfer. The adverse effects of a ping are exacerbated when the node on which the transaction that requires access to the data is executing is remotely located from the node that contains the required data, such as in the case of a distributed database system that includes nodes that are connected via a wide area network (WAN).

When a data item is "located" at a particular node, the data item is not necessarily stored in the volatile or non-volatile memory of that node. It may also mean, for example, that a lock manager that manages access to the data item resides at that node. Thus, a transaction requiring access to a data item must request the data item from the lock manager.

Figure 6:
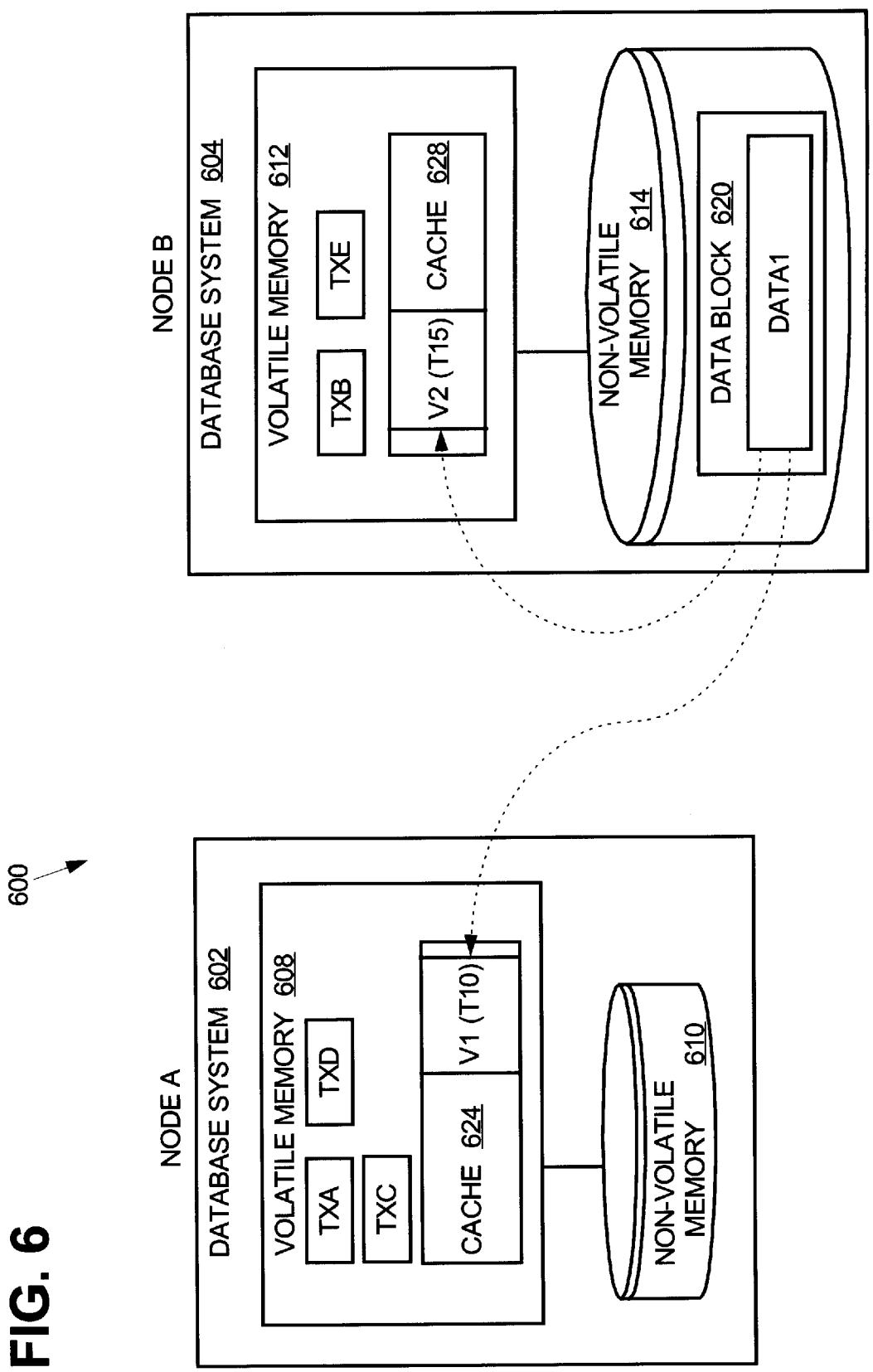
FIG. 6 is a block diagram that illustrates a conventional distributed database system.

Consider a distributed database system 600 illustrated in FIG. 6 which illustrates a transaction accessing remotely located data Distributed database system 600 includes two database systems 602 and 604, that reside on nodes NODE A and NODE B, respectively. Database system 602 includes a volatile memory 608 and a non-volatile memory 610. Non-volatile memory 610 generally represents one or more storage devices, such as magnetic or optical drives, on which a database is stored. Also, database system 604 includes a volatile memory 612 and a non-volatile memory 614.

A data item DATA1 is stored on a data block 620 that is located on non-volatile memory 614 of database system 604. When a transaction TXA, executing on database system 602 of NODE A, requires access to data item DATA1, a copy of data block 620 is loaded into a data buffer in a cache 624 in volatile memory 608. Database system 602 may reconstruct an earlier version of data block 620 to load into cache 624 by applying one or more undo records (not illustrated). Transaction TXA then updates this copy and commits at time T10 to create a first version, identified as "V1", of data block 620. Database system 602 may reconstruct an earlier version of data block 620 to load into cache 624 by applying one or more undo records (not illustrated).

Since both transaction TXA and version V1 reside in volatile memory 608, relatively fewer system resources and time are required for transaction TXA to access version V1, than are required to access a version stored on another node, such as NODE B. Likewise, transactions executing on other nodes require relatively fewer system resources and less time to access data stored locally on their respective nodes than to access data stored on node A.

Sometime later, another transaction, TXB, executing on database system 604 of NODE B, requires access to data item DATA1. Another copy of data block 620 is loaded into a cache 628 in volatile memory 612. TXB then updates the copy of data block 620 to create a version V2, and commits at time T15. Thus, version V2 reflects the state of data item DATA1 as of time T15.

Now suppose another transaction TXC begins executing in volatile memory 608 and requires access to data item DATA1 as of time T20 (snapshot time). If transaction TXC could access version V1 of data item DATA1, then this operation could be performed relatively efficiently and quickly, since transaction TXC is executing in volatile memory 608 where version V1 is stored. However, transaction TXC must access version V2 because version V2 includes an update made at time T15 which must be seen by transaction TXC. Version V1 cannot be used since it reflects the state of data item DATA1 at time T10 and does not contain the update made by transaction TXB at time T15.

However, for transaction TXC to access version V2 of data block 620, version V2 must be written back to non-volatile memory 614, on database system 604 of NODE B, and then another copy of data block 620 must be loaded into volatile memory 608 where transaction TXC is executing. When nodes NODE A and NODE B are remotely located from each other, the system resources and latencies associated with transferring version V2 between the nodes NODE B and NODE A can become significant.

The aforementioned problems associated with a transaction accessing data in a distributed database system can be even more significant when the distributed database system includes one or more "hot spots." A hot spot is a location where a data item is updated very frequently, relative to other locations. As the frequency of updates to the data item increases, the likelihood that a transaction that resides on a different node than the hot spot requiring access to the data item will cause a ping also increases. If the frequently updated data item is located in the cache of a remote node in a distributed database system, then the overhead associated with providing the updated versions to other nodes in the distributed database system can become significant.

For example, referring again to distributed database system 600 illustrated in FIG. 6, assume that version V2 has been written back to non-volatile memory 614 and that another copy of data block 620 has been loaded into cache 624 to be accessed by transaction TXC. Then a new transaction TXD, executing in volatile memory 608 and having a snapshot time of T22, requires access to data item DATA1. Transaction TXD could access version V2 which was loaded into cache 624 and has an update time of T15. However, by the time transaction TXD executes, another version V3 (not illustrated) of data block 620 may have been created in volatile memory 612 by an update made by a transaction TXE that commits at time T20. Since transaction TXD has a snapshot time of T22, transaction TXD must see the changes made by transaction TXE at time T20. However, additional system resources are required to write version V3 to non-volatile memory 614 and then load another copy of data block 620 into volatile memory 608. Moreover, as additional versions of data block 620 are created on NODE B, transactions on NODE A that require access to the updated versions will cause additional pings to occur.

LOCATION-SPECIFIC RECENCY REQUIREMENTS

According to an embodiment of the invention, an approach for managing access to data in a distributed database environment is provided. Generally, the approach is directed towards adjusting recency requirements based on the location on which a data item resides relative to the location at which a transaction that requires the data item is executing. For data items that reside at locations that have high overhead costs associated with accessing those data items, recency requirements provide a trade-off between reducing the overhead associated with accessing those data items at the cost of accessing an older version of the data items.

Figure 7:
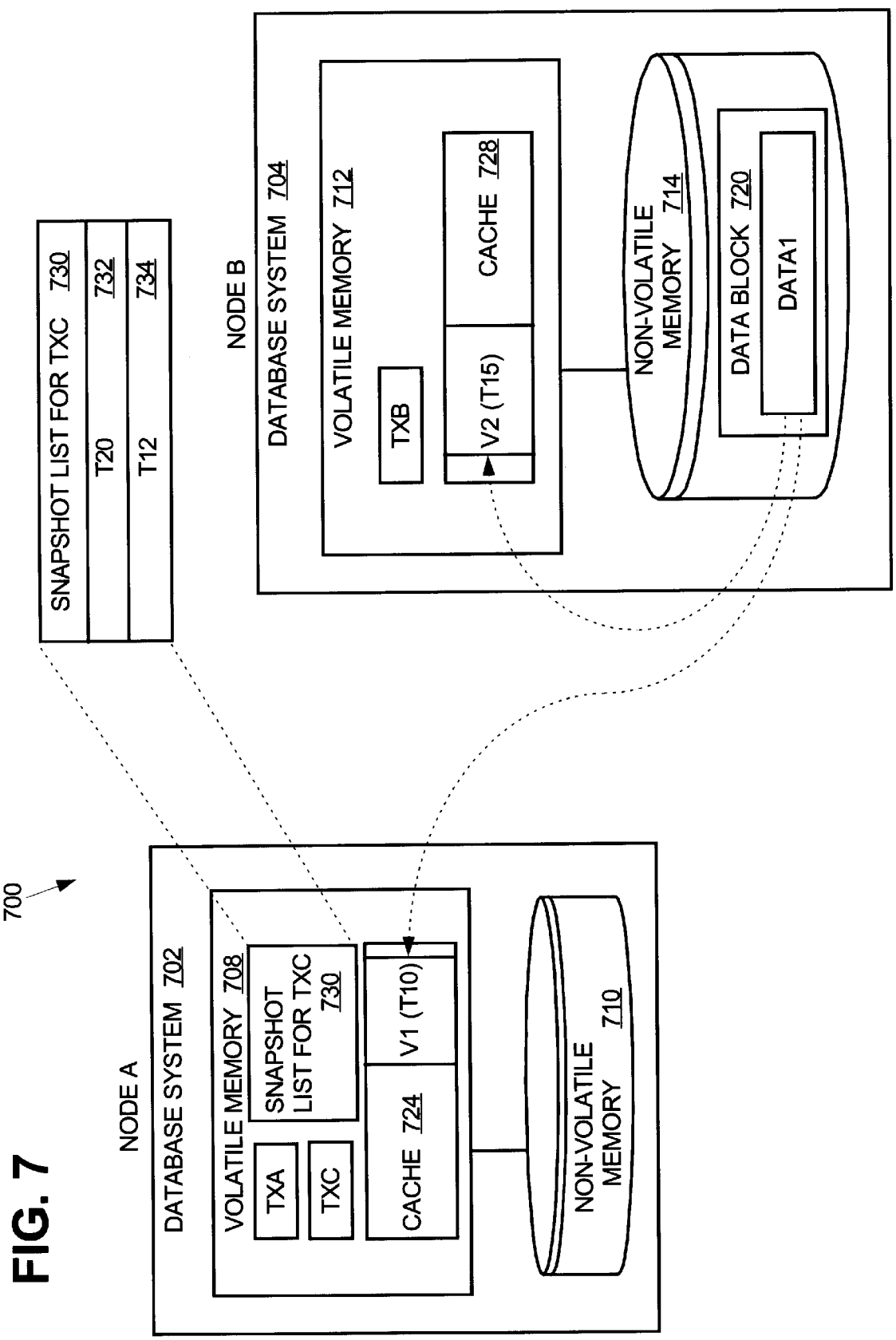
FIG. 7 is a block diagram that illustrates a distributed database system for managing access to data in a distributed database environment according to an embodiment of the invention.

FIG. 7 is a block diagram that illustrates a distributed database system 700 in which snapshot lists are used to manage access to data in a distributed database environment according to an embodiment of the invention. Distributed database system 700 includes two database systems 702 and 704 that reside on nodes NODE A and NODE B, respectively. Database system 702 includes a volatile memory 708 and a non-volatile memory 710. Non-volatile memory 710 generally represents one or more storage devices, such as magnetic or optical drives, on which a database is stored. Database system 704 includes a volatile memory 712 and a non-volatile memory 714.

A data item DATA1 is stored on a data block 720 that is located on non-volatile memory 710 of database system 704. When a transaction TXA, executing on database system 702 of NODE A, requires access to data item DATA1, a copy of data block 720 is loaded into a data buffer in a cache 724 in volatile memory 708. The copy in cache 724 is then updated by a transaction that commits at time T10 to create version V1 of data block 720.

Sometime later, transaction TXB executing on database system 704 of NODE B requires access to data item DATA 1. A version V2 of data block 720 is created in cache 728 when transaction TXB updates the copy in cache 728 and then commits at time T15. Thus, version V2 reflects the state of data block 720 at time T15.

Now suppose another transaction TXC begins executing in volatile memory 708. If transaction TXC is assigned a snapshot time of T12, then TXC could use version V1 of data item DATA1, and this operation could be performed relatively efficiently and quickly since transaction TXC is executing in volatile memory 708, where version V1 of data item DATA1 also resides. In this situation, transaction TXC cannot use version V2 because it contains a change made at time T15, which is after the snapshot time of T12 for transaction TXC. However, if transaction TXC is assigned a more recent snapshot time of T20, then TXC must see the changes included in version V2 of data item DATA1 since the changes made by transaction TXB were made at time T15, which is before transaction TXC's snapshot time of T20. Thus, the use of a less recent snapshot time for data that resides on a remote node can prevent the occurrence of a ping.

Snapshot Lists

According to an embodiment of the invention, snapshot lists are generated for transactions that require access to data on a distributed database system. A snapshot list is a list that specifies different snapshot times for different locations within the distributed database system. Each snapshot list is associated with a transaction, is generated when the associated transaction begins executing, and is deleted when the associated transaction finishes executing. Each entry in a snapshot list contains data that specifies a snapshot time for the particular location associated with the entry. The snapshot time for a location is used to determine which versions of the data items that reside at that location are to be provided to a transaction.

When a transaction requires access to a data item, the snapshot list is used to determine, based on the location of the data item, the version of the data item that is to be provided to the transaction. The values for the snapshot times in the snapshot list are selected so that the fewer system resources required to access the location at which the data item resides, relative to other locations, the more recent the snapshot time. Thus, the recency requirements are relaxed for locations that require more system resources to access.

Referring again to the block diagram of FIG. 7, a snapshot list 730 for transaction TXC contains two entries 732 and 734 that correspond to the locations of NODE A and NODE B, respectively. Entry 732 specifies a snapshot time of T20 for transaction TXC with respect to data items located on NODE A. Entry 734 specifies a snapshot time of T12 for transaction TXC with respect to data items located on NODE B.

When transaction TXC executes and requires access to data item DATA1, the location of data item DATA1 is determined. Then, a snapshot time corresponding to the location of data item DATA1 is read from snapshot list 730, which is used to determine which version of data item DATA1 is to be provided to transaction TXC.

For example, suppose transaction TXC requires access to data item DATA1. Without considering the snapshot time of transaction TXC, transaction TXC may access data block 720 directly on non-volatile memory 714, version V1 stored in cache 724, or version V2 stored in cache 728.

Snapshot list entry 732 corresponds to NODE A and entry 734 corresponds to NODE B. Since DATA1 resides on NODE B, the snapshot time in entry 734 applies to any access of DATA1 made by transaction TXC. Entry 734 specifies a snapshot time of T12. Therefore, the snapshot time of T12 is used to determine which version of data item DATA1 is to be provided to transaction TXC. Since the snapshot time for transaction TXC is time T12, version V1 that resides in volatile memory 708 with transaction TXC is provided to transaction TXC. Version V2 cannot be used because it contains a change made by a transaction that committed at time T15, which is after the snapshot time of T12.

In the event there are no existing versions of data block 720 that can be used based upon a comparison of the snapshot time for transaction TXC to the update times of the available versions, then on the appropriate version of DATA1 is reconstructed based on the snapshot time and supplied to transaction TXC.

The method for selecting a particular version of a data item to be provided to a transaction is now described with reference to the flow chart of FIG. 8. After starting in step 800, at step 802 the location of the data item is determined and the corresponding snapshot time is read from the snapshot list. Then in step 804, a determination is made as to whether a local version of the data item can be used based upon the snapshot time read from the snapshot list. If so, then in step 806, the local version of the data item is used. On the other hand, if in step 804, a local version of the data item cannot be used, then in step 808, a remote version of the data item is used. The remote version may be a version stored in the cache of a remote node or instead may be reconstructed. Then the process is complete in step 810.

DIFFERENTIAL APPROACH

According to another embodiment of the invention, a single snapshot time, designated as a "base value," is maintained for each transaction instead of a snapshot list. The base value specifies a snapshot time for the location where the transaction is executing. A set of delta snapshot times is maintained for the other locations in the distributed database system. To determine the snapshot time for the transaction at a particular location, the delta snapshot time for that location is applied to the base value for the transaction.

For example, referring to FIG. 7, the base value for transaction TXC is T20 and the delta snapshot time for NODE B is -8. Thus, the snapshot time for transaction TXC for NODE A is simply the base value of time T20. To determine the snapshot time for transaction TXC for NODE B, the delta snapshot time for NODE B of -8 is applied, in this case added, to the base value of T20 for transaction TXC to obtain a snapshot time for transaction TXC for NODE B of time T12. Other functions for applying delta snapshot times to base values may also be employed depending upon the particular requirements of an application.

USING MUST-SEE AND CANNOT SEE VALUES IN SNAPSHOT LISTS

According to another embodiment of the invention, the snapshot list entries for a transaction contain data that specifies a MUST SEE value and a CANNOT SEE value for locations in the distributed database. These values are used by the transaction to determine which versions of a data item can be used. The MUST SEE and CANNOT SEE values in the snapshot list may be selected so that the more remote the location associated with the data item, the older the versions that fall within the MUST-SEE and CANNOT-SEE values. Consequently, the need to access newer versions of data items from more remote locations will occur less frequently than the need to access newer versions of data items from less remote locations.

For example, in FIG. 7, snapshot list 730 for transaction TXC may contain four entries, two entries for NODE A and two entries for NODE B, instead of two entries (732 and 734). The two entries for NODE A would contain the MUST SEE and CANNOT SEE values for transaction TXC for data contained on NODE A. The two entries for NODE B would contain the MUST SEE and CANNOT SEE values for transaction TXC for data contained on NODE B.

The differential approach may also be used with MUST SEE and CANNOT SEE values. Instead of a single base value, a MUST SEE base value and a CANNOT SEE base value are maintained for each transaction. In addition, the set of delta snapshot time includes delta MUST SEE and CANNOT SEE values for each location in the distributed databases.

The invention provides several advantages over prior approaches for managing access to data on a distributed database system. Significantly, the use of location specific snapshot and MUST SEE/CANNOT SEE values for each transaction increases the likelihood that versions of data items that require relatively less overhead and time to access can be supplied to a transaction. This can improve data concurrency by reducing the amount of system resources and time required to process a transaction. This is particularly useful in a distributed database system where one or more nodes are remotely located, relative to other nodes in the system, and accessing versions of data stored on those remote nodes requires more system overhead.

The approach is also useful for limiting the adverse affects on systems resources and data concurrency attributable to hot spots in a distributed database system. Using the approaches described herein, the snapshot and MUST SEE/CANNOT SEE values for one or more locations with hot spots can be "tuned" so that transactions read versions of data items from hot spots less frequently and locally stored (but older) versions of the data items more frequently.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for selecting a version of a data item to be provided to a transaction executing on a distributed database system, the method comprising the steps of:
   determining version criteria based on
      which location of a plurality of locations in the distributed database system is associated with the data item, and
      which location of the plurality of locations in the distributed database system is the location at which the transaction is executing; and
   selecting, based upon the version criteria, a version of the data item to be provided to the transaction.

2. The method of claim 1, wherein the step of determining version criteria includes determining version criteria that allows relatively older versions of the data item to be used when accessing the location associated with the data item requires a relatively high amount of resources, and allowing relatively newer versions of the data item to be used when accessing the location associated with the data item requires a relatively low amount of resources.

3. The method of claim 1, wherein the step of determining version criteria includes determining version criteria that allows relatively older versions of the data item to be used when accessing the location associated with the data item requires a relatively large amount of time, and allowing relatively newer versions of the data item to be used when accessing the location associated with the data item requires a relatively little amount of time.

4. The method of claim 1, wherein
the version criteria is a snapshot list that includes a snapshot time for each of the plurality of locations, and
the step of selecting, based upon the version criteria, a version of the data item to be provided to the transaction includes the steps of:
 determining the location of the data item,
 reading a particular snapshot time that corresponds to the location of the data item from the snapshot list,
 comparing the particular snapshot time to update times for one or more versions of the data item stored on the plurality of locations, and
 selecting one of the one or more versions of the data item that reflects a change made by a transaction that updated the data item and which committed on or before the particular snapshot time.

5. The method of claim 1, wherein
the method includes the step of generating a first time and a second time for each location of the plurality of locations,
all changes made by transactions with a commit time on or before the first time must be seen by the transaction,
all changes made by transactions with a commit time after the second time cannot be seen by the transaction, and
the step of selecting, based upon the version criteria, a version of the data item to be provided to the transaction includes the step of selecting, based upon a particular first time and a particular second time for the location associated with the data item, a version of the data item to be provided to the transaction.

6. The method of claim 1, wherein
the method includes the step of generating a MUST SEE time and a CANNOT SEE time for each of the plurality of locations,
the step of selecting, based upon the version criteria, a version of the data item to be provided to the transaction, includes the step of selecting, based upon a particular MUST SEE time and a particular CANNOT SEE time for the location associated with the data item, a version of the data item to be provided to the transaction.

7. The method of claim 1, wherein
the step of determining version criteria includes the step of determining a base snapshot time for the location where the transaction is executing and a delta snapshot time for the location associated with the data item, and
the step of selecting, based upon the version criteria, a version of the data item to be provided to the transaction includes the step of selecting, based upon the base snapshot time and the delta snapshot time, a version of the data item to be provided to the transaction.

8. A computer-readable medium carrying one or more sequences of one or more instructions for selecting a version of a data item to be provided to a transaction executing on a distributed database system, the one or more sequences of one or more instructions including instructions which, when executed by one or more processors, cause the one or more processors to perform the steps of:
 determining version criteria based on
  which location of a plurality of locations in the distributed database system is associated with the data item, and
  which location of the plurality of locations in the distributed database system is the location at which the transaction is executing; and
 selecting, based upon the version criteria, a version of the data item to be provided to the transaction.

9. The computer-readable medium of claim 8, wherein the step of determining version criteria includes determining version criteria that allows relatively older versions of the data item to be used when accessing the location associated with the data item requires a relatively high amount of resources, and allowing relatively newer versions of the data item to be used when accessing the location associated with the data item requires a relatively low amount of resources.

10. The computer-readable medium of claim 8, wherein the step of determining version criteria includes determining version criteria that allows relatively older versions of the data item to be used when accessing the location associated with the data item requires a relatively large amount of time, and allowing relatively newer versions of the data item to be used when accessing the location associated with the data item requires a relatively little amount of time.

11. The computer-readable medium of claim 8, wherein
the version criteria is a snapshot list that includes a snapshot time for each of the plurality of locations, and
the step of selecting, based upon the version criteria, a version of the data item to be provided to the transaction includes the steps of:
 determining the location of the data item,
 reading a particular snapshot time that corresponds to the location of the data item from the snapshot list,
 comparing the particular snapshot time to update times for one or more versions of the data item stored on the plurality of locations, and
 selecting one of the one or more versions of the data item that reflects a change made by a transaction that updated the data item and which committed on or before the particular snapshot time.

12. The computer-readable medium of claim 8, wherein
the method includes the step of generating a first time and a second time for each location of the plurality of locations,
all changes made by transactions with a commit time on or before the first time must be seen by the transaction,
all changes made by transactions with a commit time after the second time cannot be seen by the transaction, and
the step of selecting, based upon the version criteria, a version of the data item to be provided to the transaction includes the step of selecting, based upon a particular first time and a particular second time for the location associated with the data item, a version of the data item to be provided to the transaction.

13. The computer-readable medium of claim 8, wherein
the method includes the step of generating a MUST SEE time and a CANNOT SEE time for each of the plurality of locations,
the step of selecting, based upon the version criteria, a version of the data item to be provided to the transaction, includes the step of selecting, based upon a particular MUST SEE time and a particular CANNOT SEE time for the location associated with the data item, a version of the data item to be provided to the transaction.

14. The computer-readable medium of claim 8, wherein
the step of determining version criteria includes the step of determining a base snapshot time for the location where the transaction is executing and a delta snapshot time for the location associated with the data item, and
the step of selecting, based upon the version criteria, a version of the data item to be provided to the transaction includes the step of selecting, based upon the base snapshot time and the delta snapshot time, a version of the data item to be provided to the transaction.

15. A computer system for selecting a version of a data item to be provided to a transaction executing on a distributed database system, the computer system comprising:
one or more processors; and
a memory coupled to the one or more processors and containing one or more sequences of one or more instructions, the one or more sequences of one or more instructions including instructions which, when executed by the one or more processors, cause the one or more processors to perform the steps of:
determining version criteria based on
which location of a plurality of locations in the distributed database system is associated with the data item, and
which location of the plurality of locations in the distributed database system is the location at which the transaction is executing; and
selecting, based upon the version criteria, a version of the data item to be provided to the transaction.

16. The computer system of claim 15, wherein the step of determining version criteria includes determining version criteria that allows relatively older versions of the data item to be used when accessing the location associated with the data item requires a relatively high amount of resources, and allowing relatively newer versions of the data item to be used when accessing the location associated with the data item requires a relatively low amount of resources.

17. The computer system of claim 15, wherein the step of determining version criteria includes determining version criteria that allows relatively older versions of the data item to be used when accessing the location associated with the data item requires a relatively large amount of time, and allowing relatively newer versions of the data item to be used when accessing the location associated with the data item requires a relatively little amount of time.

18. The computer system of claim 15, wherein
the version criteria is a snapshot list that includes a snapshot time for each of the plurality of locations, and
the step of selecting, based upon the version criteria, a version of the data item to be provided to the transaction includes the steps of:

determining the location of the data item,
reading a particular snapshot time that corresponds to the location of the data item from the snapshot list,
comparing the particular snapshot time to update times for one or more versions of the data item stored on the plurality of locations, and
selecting one of the one or more versions of the data item that reflects a change made by a transaction that updated the data item and which committed on or before the particular snapshot time.

19. The computer system of claim 15, wherein
the method includes the step of generating a first time and a second time for each location of the plurality of locations,
all changes made by transactions with a commit time on or before the first time must be seen by the transaction,
all changes made by transactions with a commit time after the second time cannot be seen by the transaction, and
the step of selecting, based upon the version criteria, a version of the data item to be provided to the transaction includes the step of selecting, based upon a particular first time and a particular second time for the location associated with the data item, a version of the data item to be provided to the transaction.

20. The computer system of claim 15, wherein
the method includes the step of generating a MUST SEE time and a CANNOT SEE time for each of the plurality of locations,
the step of selecting, based upon the version criteria, a version of the data item to be provided to the transaction, includes the step of selecting, based upon a particular MUST SEE time and a particular CANNOT SEE time for the location associated with the data item, a version of the data item to be provided to the transaction.

21. The computer system of claim 15, wherein
the step of determining version criteria includes the step of determining a base snapshot time for the location where the transaction is executing and a delta snapshot time for the location associated with the data item, and
the step of selecting, based upon the version criteria, a version of the data item to be provided to the transaction includes the step of selecting, based upon the base snapshot time and the delta snapshot time, a version of the data item to be provided to the transaction.

* * * * *